(12) United States Patent
Bazin et al.

(10) Patent No.: US 12,713,213 B1
(45) Date of Patent: Aug. 18, 2026

(54) MULTI-MODAL LOCALIZATION

(71) Applicant: Apple Inc., Cupertino, CA (US)

(72) Inventors: Jean-Charles Bernard Marcel Bazin, Sunnyvale, CA (US); Anselm Grundhoefer, Campbell, CA (US); Arun Srivatsan Rangaprasad, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 789 days.

(21) Appl. No.: 17/852,046

(22) Filed: Jun. 28, 2022

Related U.S. Application Data

(60) Provisional application No. 63/246,651, filed on Sep. 21, 2021.

(51) Int. Cl.
*H04W 4/33* (2018.01)
*G01S 5/14* (2006.01)
*H04W 4/029* (2018.01)
*H04W 64/00* (2009.01)

(52) U.S. Cl.
CPC ................. *H04W 4/33* (2018.02); *G01S 5/14* (2013.01); *H04W 4/029* (2018.02); *H04W 64/003* (2013.01)

(58) Field of Classification Search
CPC ..... H04W 4/33; H04W 4/029; H04W 64/003; G01S 5/14; H01Q 1/2291; H02J 13/00026
See application file for complete search history.

(56) References Cited

U.S. PATENT DOCUMENTS 10,055,862 B2 * 8/2018 Bliss ........................ G06F 17/15
10,379,514 B2 * 8/2019 Balraj .................. G05B 19/048
11,550,276 B1 * 1/2023 Lee ....................... G06F 18/214
2013/0247117 A1 * 9/2013 Yamada ................ H04W 12/06 340/12.5
2014/0179348 A1 * 6/2014 Simon ................... H04W 4/029 455/456.1
2015/0149085 A1 * 5/2015 Bakshi ................... G01C 21/16 701/500
2016/0227367 A1 * 8/2016 Alsehly ................. H04W 4/025
2018/0108235 A1 * 4/2018 Ginocchio .............. H04W 4/02
2020/0015042 A1 * 1/2020 Yang ..................... G06F 1/1694
2020/0380242 A1 * 12/2020 Kim ....................... G06V 20/10

FOREIGN PATENT DOCUMENTS

WO WO-2014182420 A2 * 11/2014 ............. G01S 19/48

* cited by examiner

*Primary Examiner* — Christopher M Brandt
(74) *Attorney, Agent, or Firm* — Fernando & Partners, LLP

(57) ABSTRACT

In one implementation, a method of localizing a device is performed by a device including a plurality of sensors, one or more processors, and non-transitory memory. The method includes obtaining a plurality of enrolled location signatures respectively associated with a plurality of locations. The method includes obtaining data from a plurality of sensors. The method includes generating a current location signature based on the data obtained from the plurality of sensors. The method includes determining a location of the device based on the current location signature and the plurality of enrolled location signatures.

20 Claims, 6 Drawing Sheets

MULTI-MODAL LOCALIZATION

CROSS-REFERENCE TO RELATED APPLICATIONS

This application claims priority to U.S. Provisional Patent App. No. 63/246,651, filed on Sep. 21, 2021, which is hereby incorporated by reference in its entirety.

TECHNICAL FIELD

The present disclosure generally relates to systems, methods, and devices for determining a location of an electronic device.

BACKGROUND

Determining the location (e.g., localization) of an electronic device enables a wide range of user experiences, such as automatically turning on a light when the electronic device enters a room, adjusting a speaker volume based on distance from the speaker to the electronic device, or displaying previously placed extended reality (XR) content in an environment in which the electronic device is present. However, methods of localization can be inaccurate and/or computationally expensive and, therefore, power expensive.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
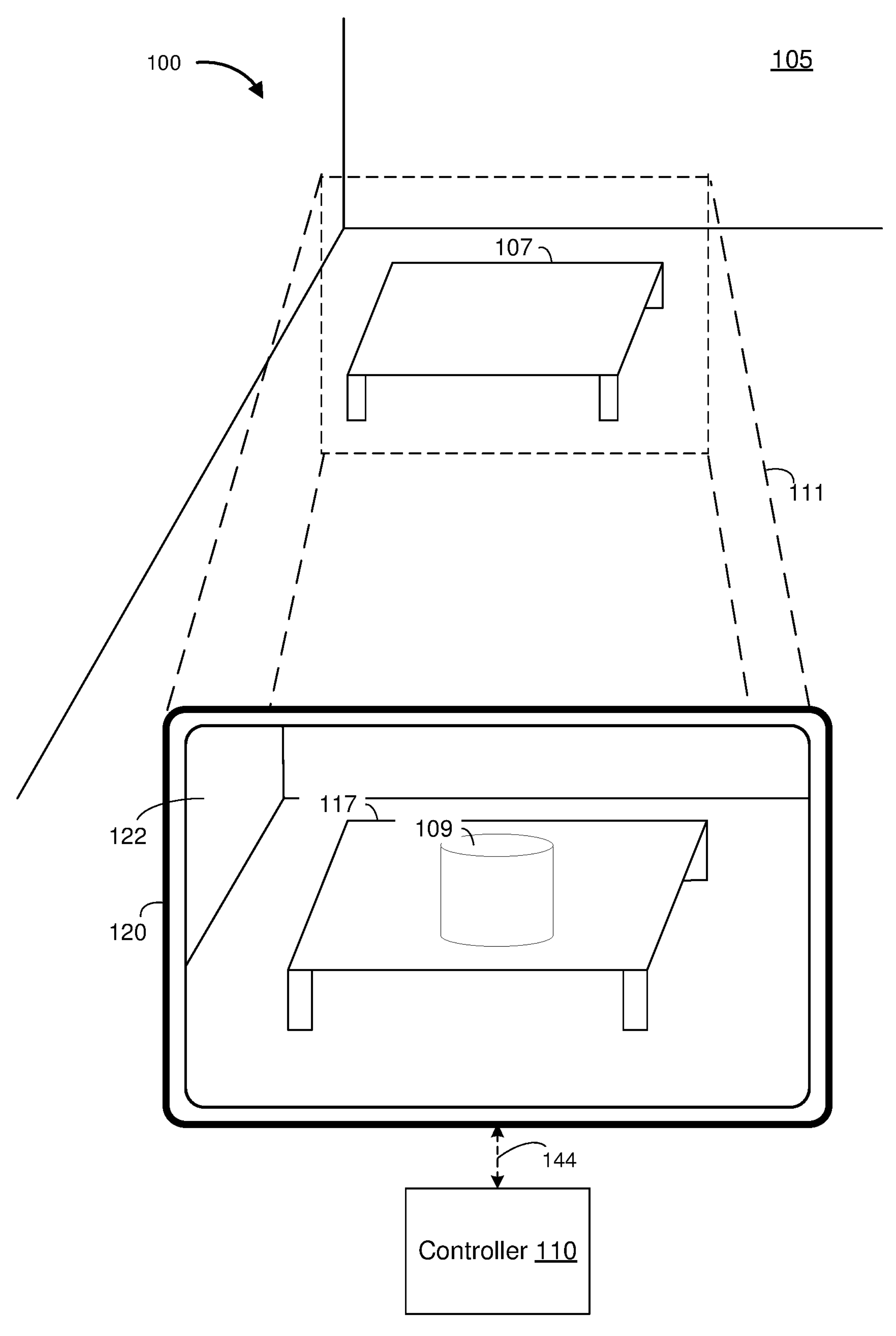
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for localizing a device. In various implementations, the method is performed by a device including a plurality of sensors, one or more processors, and non-transitory memory. The method includes obtaining a plurality of enrolled location signatures respectively associated with a plurality of locations. The method includes obtaining data from a plurality of sensors. The method includes generating a current location signature based on the data obtained from the plurality of sensors. The method includes determining a location of the device based on the current location signature and the plurality of enrolled location signatures.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

A physical environment refers to a physical place that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As an example, the XR system may detect movement of the electronic device presenting the XR environment (e.g., a mobile phone, a tablet, a laptop, a head-mounted device, and/or the like) and, in response, adjust graphical content and an acoustic field presented by the electronic device to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light sources, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As noted above, methods of localization can be inaccurate and/or computationally expensive and, therefore, power expensive. To improve the accuracy, robustness, and range of feasibility (e.g., light environments and dark environments), in various implementations, the data from multiple different sensors (and different kinds of sensors) are used to determine the location of an electronic device. To reduce the computation burden, in various implementations, the data from the multiple sensors at various locations are embedded to form various location signatures to which a current location signature can be easily compared.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display an XR object (e.g., an XR cylinder 109) and to enable video pass-through of the physical environment 105 (e.g., including a representation 117 of the table 107) on a display 122. The electronic device 120 is described in greater detail below with respect to FIG. 3.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more XR displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

Figure 2:
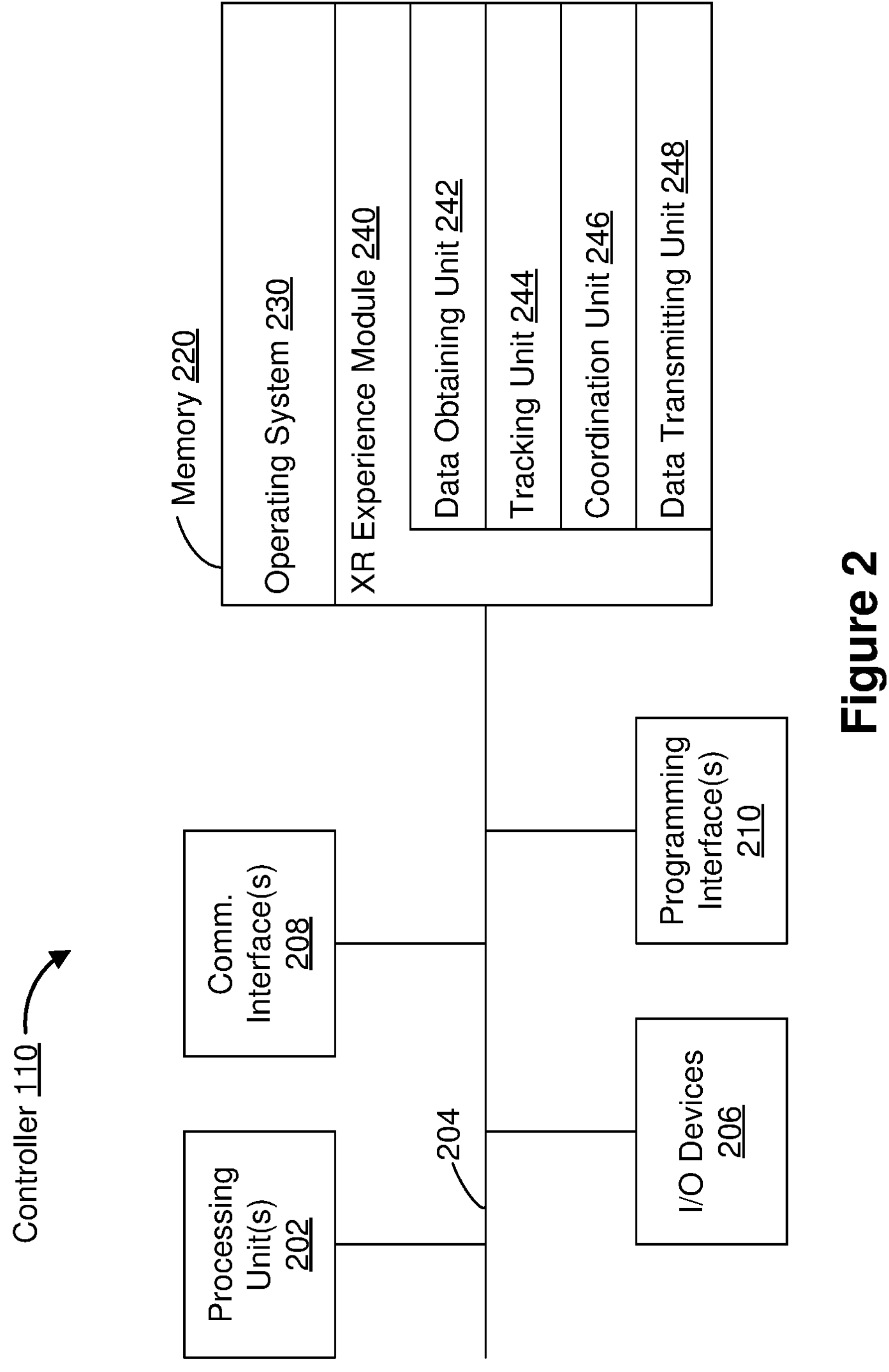
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory

220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an XR experience module 240.

The operating system 230 includes procedures for handling various basic system services and for performing hardware dependent tasks. In some implementations, the XR experience module 240 is configured to manage and coordinate one or more XR experiences for one or more users (e.g., a single XR experience for one or more users, or multiple XR experiences for respective groups of one or more users). To that end, in various implementations, the XR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the electronic device 120 of FIG. 1. To that end, in various implementations, the data obtaining unit 242 includes instructions and/or logic therefor, and heuristics and metadata therefor.

In some implementations, the tracking unit 244 is configured to map the physical environment 105 and to track the position/location of at least the electronic device 120 with respect to the physical environment 105 of FIG. 1. To that end, in various implementations, the tracking unit 244 includes instructions and/or logic therefor, and heuristics and metadata therefor.

In some implementations, the coordination unit 246 is configured to manage and coordinate the XR experience presented to the user by the electronic device 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the electronic device 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
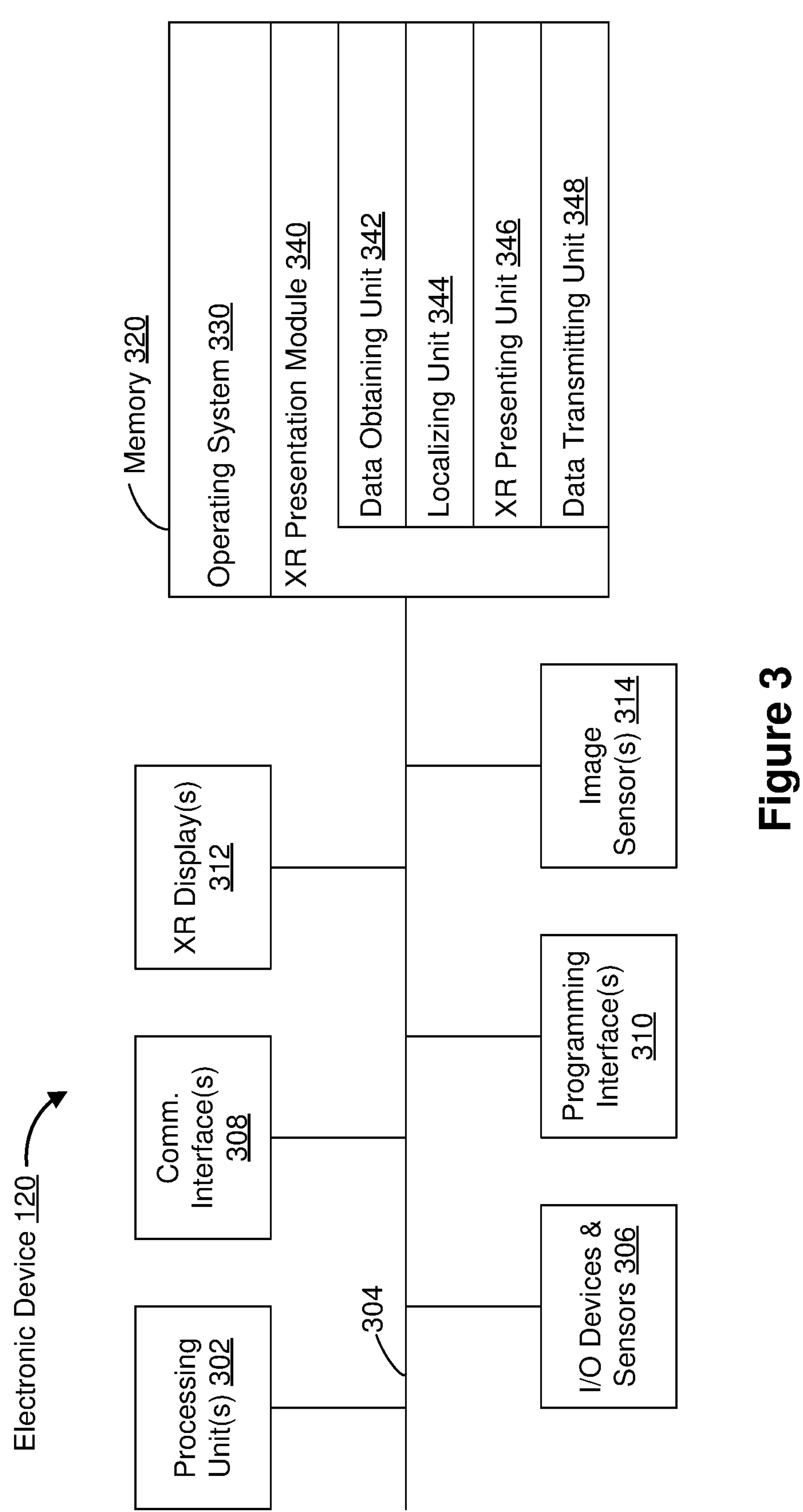
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, a barometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 312 are configured to provide the XR experience to the user. In some implementations, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 312 correspond to diffractive, reflective, polarized, holographic, etc. waveguide displays. For example, the electronic device 120 includes a single XR display. In another example, the electronic device includes an XR display for each eye of the user. In some implementations, the one or more XR displays 312 are capable of presenting MR and VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the physical environment as would be viewed by the user if the electronic device 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation module 340.

The operating system 330 includes procedures for handling various basic system services and for performing hardware dependent tasks. In some implementations, the XR presentation module 340 is configured to present XR content to the user via the one or more XR displays 312. To that end, in various implementations, the XR presentation module 340 includes a data obtaining unit 342, a localizing unit 344, an XR presenting unit 346, and a data transmitting unit 348.

In some implementations, the data obtaining unit 342 is configured to obtain data (e.g., presentation data, interaction data, sensor data, location data, etc.) from at least the controller 110 of FIG. 1. To that end, in various implementations, the data obtaining unit 342 includes instructions and/or logic therefor, and heuristics and metadata therefor.

In some implementations, the localizing unit 344 is configured to determine a location of the electronic device 120 based on data from a plurality of the I/O devices and sensors 306. To that end, in various implementations, the localizing unit 344 includes instructions and/or logic therefor, and heuristics and metadata therefor.

In some implementations, the XR presenting unit 346 is configured to display images including the XR content via the one or more XR displays 312. To that end, in various implementations, the XR presenting unit 346 includes instructions and/or logic therefor, and heuristics and metadata therefor.

In some implementations, the data transmitting unit 348 is configured to transmit data (e.g., presentation data, location data, etc.) to at least the controller 110. To that end, in various implementations, the data transmitting unit 348 includes instructions and/or logic therefor, and heuristics and metadata therefor.

Although the data obtaining unit 342, the localizing unit 344, the XR presenting unit 346, and the data transmitting unit 348 are shown as residing on a single device (e.g., the electronic device 120), it should be understood that in other implementations, any combination of the data obtaining unit 342, the localizing unit 344, the XR presenting unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
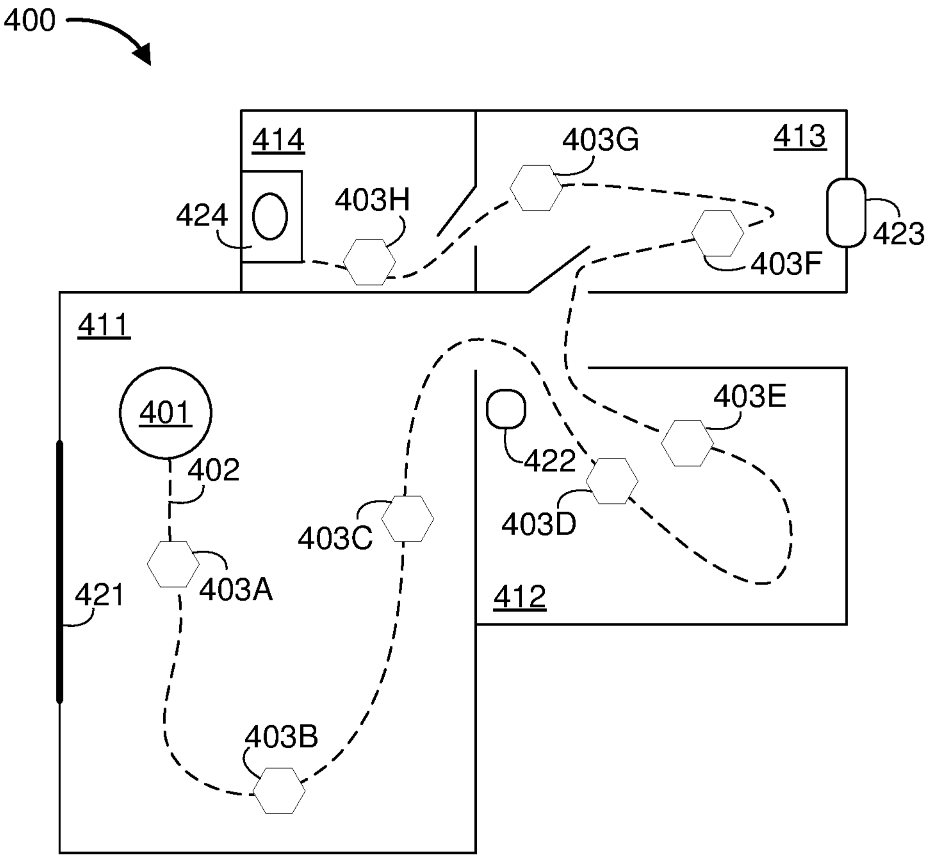
FIG. 4 illustrates a floor plan of an example environment during an enrollment phase in accordance with some implementations.

FIG. 4 illustrates a floor plan 400 of an example environment during an enrollment phase in accordance with some implementations. The environment includes a living room 411, a kitchen 412, a bedroom 413, and a bathroom 414. The living room 411 includes large windows 421 making the living room 411 significantly brighter than other rooms in the environment. The kitchen 412 includes a WLAN (wide local area network) router 422 in a central location of the environment. Thus, WLAN signal strength is strongest in the kitchen 412, slightly less strong in the living room 411 and bedroom 413, and weakest in the bathroom 414. The bedroom 413 includes a window-mounted air conditioner 423 making the bedroom 413 significantly cooler than other rooms in the environment. The bathroom 414 includes a sink 424 which generates the sound of water running when activated by a user to, e.g., wash the user's hands and, in various implementations, the sound of water dripping at all times.

During an enrollment phase, a user carrying (e.g., wearing) an electronic device 401 traverses the environment along a path 402. The electronic device 401 is in communication with a plurality of sensors including, but not limited to, an ambient light sensor (ALS), a WLAN signal detector, a thermometer, and a microphone. Thus, in various implementations, the plurality of sensors includes a plurality of sensors of different sensor types that generate data based on a different physical properties, such as visible light, WLAN signals, temperature, and sound.

In various implementations, the electronic device 401 includes one or more of the plurality of sensors. In various implementations, the electronic device 401 includes all of the plurality of sensors. In various implementations, the electronic device 401 is in communication with one or more secondary electronic devices in proximity to the electronic device 401. For example, in various implementations, a secondary electronic device is a wearable device such as a head-mounted device or a smart watch or another type of portable device such as a smart phone, tablet, or laptop. In various implementations, the one or more secondary electronic devices includes one or more of the plurality of sensors. In various implementations, the one or more secondary electronic devices include all of the plurality of sensors and the electronic device 401 includes none of the plurality of sensors.

At various locations 403A-403H along the path 402, the electronic device 401 retrieves data from the plurality of sensors and localizes the electronic device 401 using various methods, including such computationally expensive methods such as VIO (visual inertial odometry)/SLAM (simultaneous localization and mapping) or GPS (global positioning system).

For each of the locations 403A-403H, the electronic device 401 stores the determined location in association with a location signature generated from the data from the plurality of sensors. In various implementations, the locations and the respective location signatures are stored on the electronic device 401. In various implementations, the locations and the respective location signatures are stored on a location signature server remote from the electronic device 401. Once stored in association with respective locations, the location signatures are referred to as enrolled location signatures.

In various implementations, to generate a location signature for a respective location, the electronic device 401 concatenates the data from the plurality of sensors at the respective location to form a concatenated vector. In various implementations, the location signature is the concatenated vector. In various implementations, the electronic device 401 extracts a set of features from all of the concatenated vectors at the locations 403A-403H and determines, for each of the locations 403A-403H, a feature vector indicative of the amount of each of the set of features in the respective concatenated vector. In various implementations, the location signature is the feature vector. The feature vectors can be determined using any of a number of dimensionality reduction techniques, such as principal component analysis, independent component analysis, non-negative matrix factorization, or an autoencoder. In various implementations, the feature vectors are extracted by a deep neural network.

In various implementations, for each sensor, the electronic device 401 extracts a set of sensor-specific features from all of the data from the sensor at the locations 403A-403H and determines, for each of the locations 403A-403H, a sensor-specific feature vector indicative of the amount of each of the set of sensor-specific features in the respective data from the sensor. In various implementations, to generate a location signature for a respective location, the electronic device 401 concatenates the sensor-specific feature vectors at the respective location to form a concatenated feature vector. In various implementations, the location signature is the concatenated feature vector.

In various implementations, the location signature is generated using other methods to reduce the dimensionality of the data from the plurality of sensors.

The location signatures at the various locations 403A-403H differ by virtue of the different environmental characteristics of the locations 403A-403H. For example, the location signature associated with a first location 403A of the locations 403A-403H includes data from the ambient light sensor indicating that the first location 403A is brighter than the other locations. As another example, the location signature associated with a sixth location 403F of the locations 403A-403H includes data from the thermometer indicating that the sixth location 403F is colder than the other locations. In various implementations, the location signature associated with a third location 403C of the locations 403A-403H and an eighth location 403H of the locations 403A-403H both include data from the thermometer indicating that they are the same temperature. However, the location signature associated with the third location 403C includes data from the ambient light sensor indicating that the third location 403C is brighter than the eighth location 403H and the location signature associated with the eighth location 403H includes data from the microphone indicating that the eighth location 403H is closer to running (or dripping) water than the third location 403C. In such a way, using multiple sensors, the third location 403C and the eighth location 403H can be disambiguated.

Figure 5:
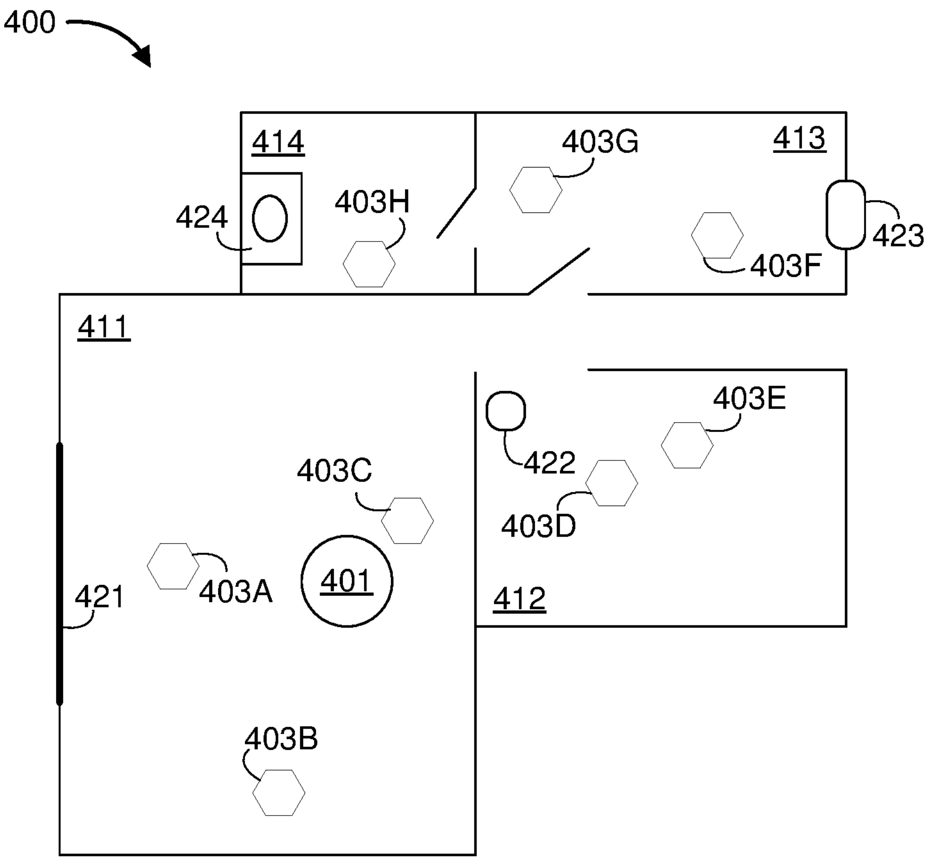
FIG. 5 illustrates the floor plan of FIG. 4 during a query phase in accordance with some implementations.

FIG. 5 illustrates the floor plan 400 of the example environment during a query phase in accordance with some implementations. During the query phase, the electronic device 401 has moved to a particular location in the living room 411. To localize the electronic device, rather than using a computationally expensive algorithm, such as VIO/SLAM, the electronic device 401 obtains current data from the plurality of sensors and determines a current location signature based on the current data. The electronic device determines the current location based on the current location signature and the plurality of enrolled location signatures.

In various implementations, the electronic device determines the current location based on the current location signature and the plurality of enrolled location signatures by comparing the current location signature to the plurality of enrolled location signatures to select one or more of the plurality of enrolled location signatures. The electronic device 401 then determines the location of the electronic device 401 based on the selected one or more of the plurality of enrolled location signatures.

In various implementations, the electronic device 401 selects a single enrolled location signature and the determined location is the location stored in association with the single enrolled location signature. In various implementations, the electronic device 401 selects the enrolled location signature most similar to the current location signature. Similarity can be measured using any of variety of methods. For example, in various implementations, the electronic device 401 selects the enrolled location signature nearest to the current location signature in the location signature space (e.g., sensor space). For example, in FIG. 5, the electronic device 401 selects the enrolled location signature stored in association with the third location 403A and correspondingly determines the location of the electronic device 401 is the third location 403A.

In various implementations, the electronic device 401 selects multiple enrolled location signatures and the determined location is a location between the multiple locations stored in respective association with the multiple enrolled location signatures, e.g., using interpolation. In various implementations, the electronic device 401 selects a fixed number of enrolled location signatures most similar to the current location signature. For example, in various implementations, the electronic device 401 selects the N enrolled location signatures closest to the current location signature in the location signature space. In various implementations, the electronic device 401 selects all enrolled location signatures sufficiently similar to the current location signature. For example, in various implementations, the electronic device 401 selects all the enrolled location signatures within a threshold distance of the current location signature in the signature space. For example, in FIG. 5, the electronic device 401 selects the enrolled location signatures stored in association with the first location 403A, a second location 403B of the locations 403A-403H, and the third location 403C and correspondingly determines the location of the electronic device 401 is between these locations.

In various implementations, the electronic device determines the current location based on the current location signature and the plurality of enrolled location signatures by determining a regression function based on the plurality of enrolled location signatures that maps a location signature to a location. By applying the regression function to the current location signature, a currently location is determined.

Figure 6:
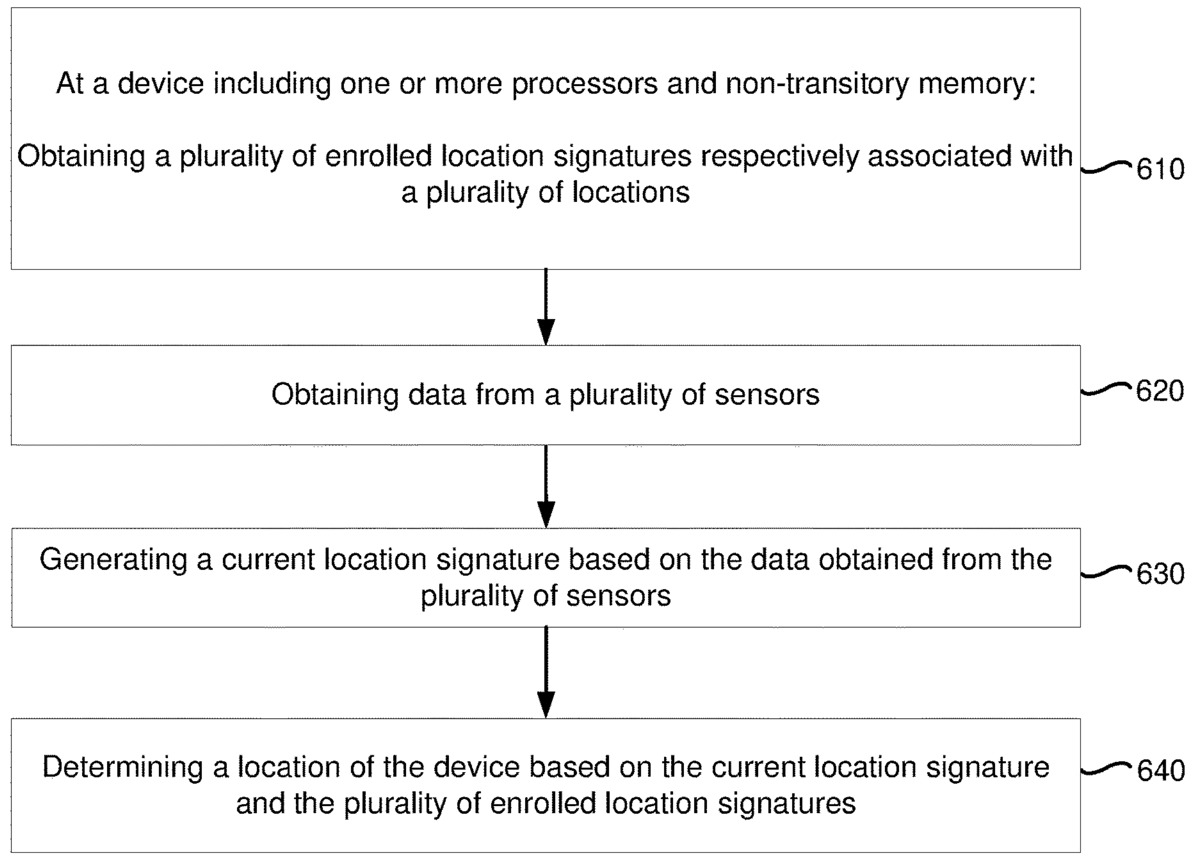
FIG. 6 is a flowchart representation of a method of localizing a device in accordance with some implementations.

FIG. 6 is a flowchart representation of a method of localizing a device in accordance with some implementations. In various implementations, the method 600 is performed by a device one or more processors and non-transitory memory (e.g., the electronic device 120 of FIG. 3). In some implementations, the method 600 is performed by processing logic, including hardware, firmware, software, or a combination thereof. In some implementations, the method 600 is performed by a processor executing instructions (e.g., code) stored in a non-transitory computer-readable medium (e.g., a memory).

The method 600 begins, in block 610, with the device obtaining a plurality of enrolled location signatures respectively associated with a plurality of locations. In various implementations, the plurality of enrolled location signatures is obtained from a local storage, e.g., the non-transitory memory. In various implementations, the plurality of enrolled location signatures is obtained from a remote storage. In various implementations, the local storage and/or the remote storage includes multiple sets of enrolled location signatures respectively associated with different general locations. For example, a local storage may include a first set of enrolled location signatures associated with a home of the user and a second set of enrolled location signatures associated with an office of the user. As another example, a remote storage may include multiple sets of enrolled location signatures generated by multiple users in various public and private locations. Accordingly, in various implementations, the plurality of enrolled location signatures obtained by the device is a set of enrolled location signatures selected from multiple sets of enrolled location signatures in a storage. In various implementations, the device selects the set based on a general location, e.g., using GPS and/or other data (e.g., a time of day a user is expected to be at home or at the office).

In various implementations, one or more of the plurality of enrolled location signatures are generated by the device during an enrollment stage as described above with respect to FIG. 4. In various implementations, one or more of the plurality of enrolled location signatures are periodically passively generated by the device when the amount of available power is above a threshold, e.g., enough to use more power expensive localization methods such as VIO. In various implementations, one or more of the plurality of enrolled location signatures are generated by the device is response to a location query when the amount of available power is above a threshold. In various implementations, one or more of plurality of enrolled location signatures are generated by other devices, including devices of other users.

The method 600 continues, in block 620, with the device obtaining signature data from a plurality of sensors. In various implementations, the plurality of sensors includes a plurality of sensors of different sensor types that generate data based on a different physical properties.

In various implementations, the device includes one or more of the plurality of sensors. In various implementations, the device includes all of the plurality of sensors. In various implementations, the device is in communication with one or more secondary devices in proximity to the device. For example, in various implementations, a secondary device is a wearable device such as a head-mounted device or a smart watch or another type of portable device such as a smart phone, tablet, or laptop. In various implementations, the one or more secondary devices includes one or more of the plurality of sensors. Thus, in various implementations, obtaining the data from the plurality of sensors includes obtaining the data from one or more sensors of a secondary device. In various implementations, obtaining the data from one or more sensors of the secondary device includes determining that the secondary device is within a threshold distance of the device and, in response to determining that the secondary device is within the threshold distance of the device, obtaining the data from the one or more sensors of the secondary device. In various implementations, the device determines that the secondary device is within the threshold distance of the device by determining that the secondary device is paired via a short-range communications protocol. In various implementations, the device determines that the sensor data from secondary device has a degree of correspondence with data from the device, e.g., an IMU on each device senses similar motion indicating that they are both on the user. In various implementations, the one or more secondary devices include all of the plurality of sensors and the device includes none of the plurality of sensors.

In various implementations, the plurality of sensors includes a camera. Thus, in various implementations, the data obtained from the plurality of sensors includes images of an environment. In various implementations, the data obtained from the plurality of sensors includes data based on the images of the environment. In various implementations, the data based on the images of the environment includes spatial features (e.g., points, lines, planes, or volumes, such as particular objects) detected in the environment. For example, referring to the floor plan 400 of FIG. 4, in various implementations, the electronic device 401 determines the location of the electronic device 401 as being in the living room 411 based on detecting the large windows 421 in an image of the environment. In various implementations, the data based on the images of the environment includes colors detected the environment. For example, referring to the floor plan 400 of FIG. 4, in various implementations, the bedroom 413 is painted green and the electronic device 401 determines the location of the electronic device 401 as being in the bedroom 413 based on detecting green in an image of the environment.

In various implementations, the plurality of sensors includes an inertial measurement unit (IMU). Using the camera and the inertial measurement unit, in various implementations, the device performs VIO to localize the device. In various implementations, VIO localization supplements signature-based localization.

In various implementations, the plurality of sensors includes at least one of a global positioning system (GPS) sensor, a compass, or an altimeter. Thus, in various implementations, the data obtained from the plurality of sensors includes at least one of a latitude, a longitude, an altitude, or a cardinal direction.

In various implementations, the plurality of sensors includes at least one of a wireless local area network (WLAN) signal detector, magnetometer, thermometer, or ambient light sensor. Thus, in various implementations, the data obtained from the plurality of sensors includes at least one of strength of a WLAN signal, a strength of a magnetic field, a temperature, or a strength of ambient light. For example, referring to the floor plan 400 of FIG. 4, in various implementations, the electronic device 401 determines the location of the electronic device 401 as being in the living room 411 based on detecting a large amount of ambient light.

In various implementations, the plurality of sensors includes a microphone. Thus, in various implementations, the data obtained from the plurality of sensors includes audio of an environment. For example, referring to the floor plan 400 of FIG. 4, in various implementations, the electronic device 401 determines the location of the electronic device 401 as being in the bathroom 414 based on detecting audio of water running (or dripping).

In various implementations, the plurality of sensors includes a context sensor that determines an action of a user. The context sensor may receive data from others of the plurality of sensors to determine the action of the user, e.g., using one or more processing units. For example, in various implementations, the context sensor determines that a user is washing the user's hands based on detecting the sound of water running in audio of the environment, detecting particular hand motion in images of the environment, and/or detecting motion of the user using an IMU. As another example, in various implementations, the context sensor determines that a user is eating based on detecting the sound of chewing in audio of the environment, detecting food in images of the environment, and/or detecting motion of the user using an IMU. For example, referring to the floor plan 400 of FIG. 4, in various implementations, the electronic device 401 determines the location of the electronic device 401 as being in the bathroom 414 based on detecting that the user is washing the user's hands. For example, referring to the floor plan 400 of FIG. 4, in various implementations, the electronic device 401 determines the location of the electronic device 401 as being in the kitchen 412 based on detecting that the user is eating.

The method 600 continues, in block 630, with the device obtaining a current location signature based on the data obtained from the plurality of sensors. In various implementations, obtaining the current location signature includes generating a concatenated vector by concatenating the data obtained from the plurality of sensors. In various implementations, obtaining the current location signature further includes determining a feature vector indicative of an amount of each of a set of features in the concatenated vector. The feature vector includes a plurality of elements, each of the plurality of elements having a value indicating an amount of a respective one of the set of features in the concatenated vector. In various implementations, the set of features is obtained using a dimensionality reduction algorithm on the plurality of enrolled location signatures.

In various implementations, obtaining the current location signature includes determining, for each of the plurality of sensors, a sensor-specific feature vector indicative of the amount of each of a set of sensor-specific features in the data from the sensor. Further, obtaining the current location signature includes generating a concatenated feature vector by concatenating the sensor-specific feature vectors.

The method 600 continues, in block 640, with the device determining a location of the device based on the current location signature at the plurality of enrolled location signatures. In various implementations, determining the location of the device based on the current location signature and the plurality of enrolled location signatures includes selecting one or more of the plurality of locations based on comparing the current location signature to the plurality of enrolled location signatures. In various implementations, the one or more of the plurality of locations are selected based on respective similarity metrics between the current location signature and each of the plurality of enrolled location signatures. In various implementations, the one or more of the plurality of locations are selected based on respective distances between the current location signature and each of the plurality of enrolled location signatures. In various implementations, a location is more likely to be selected with a smaller distance between the current location signature and the respective enrolled location signature.

In various implementations, selecting one or more of the plurality of locations includes selecting a single location of the plurality of locations. For example, in various implementations, the single location is the respective location of the enrolled location signature closest to the current location signature. In various implementations, determining the location of the device includes determining the location of the device as the single location.

In various implementations, selecting one or more of the plurality of locations (includes selecting multiple locations of the plurality of locations. For example, in various implementations, the multiple locations are the respective locations of the N enrolled location signatures closest to the current location signature. In various implementations, N is at least three. In various implementations, N is at least four. In various implementations, determining the location of the device includes determining the location of a device between the multiple locations. For example, in various implementations, the location of the device is an interpolation between the multiple locations (e.g., a weighting of the multiple locations based on the distances).

In various implementations, determining the location of the device based on the current location signature and the plurality of enrolled location signatures includes determining a regression function based on the plurality of enrolled location signatures and the respectively associated plurality of locations and applying the regression function to the current location signature to determine the location of the device.

In various implementations, determining the location of the device includes determining a probability that the device is located at each of a plurality of locations, or at least a subset of the plurality of locations, e.g., those closest in sensor space. In various implementations, the probabilities are output as a heatmap, e.g., a floor plan grid where each cell of the grid is associated with a probability that the device is located in that cell.

In various implementations, the location signature at a particular location can vary over time. For example, referring to the floor plan 400 of FIG. 4, the ambient light coming through the large windows 421 in the living room 411 changes based on the time of day (the change itself varying based on the time of year). Thus, in various implementations, the method 600 includes determining a current time and selecting a subset of the plurality of enrolled location signatures based on the current time and respective times associated with each of the plurality of enrolled location signatures. For example, referring to the floor plan 400 of FIG. 4, the enrolled location signatures can include a set of enrolled location signatures for daytime and a set of enrolled location signatures for nighttime. In various implementations, selecting the one or more of the plurality of locations (in block 630) is based on comparing the current location signature to the subset of the plurality of enrolled location signatures.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at a device having one or more processors and non-transitory memory;

obtaining a plurality of enrolled location signatures respectively associated with a plurality of locations in an environment, wherein the plurality of enrolled location signatures are generated by the device based on sensor data from sensors captured in the environment during enrollment;

obtaining data from a plurality of sensors;

generating a current location signature based on the data obtained from the plurality of sensors; and determining a location of the device in the environment by selecting one or more enrolled locations signatures from the plurality of enrolled location signatures closest to the current location signature, and setting the location of the device to a respective location in association with the one or more enrolled locations.

2. The method of claim 1, wherein obtaining the data from the plurality of sensors includes obtaining data from one or more sensors of the device.

3. The method of claim 2, wherein the one or more sensors of the device include all of the plurality of sensors.

4. The method of claim 1, wherein obtaining the data from the plurality of sensors includes obtaining data from one or more sensors of a secondary device.

5. The method of claim 4, wherein obtaining the data from the one or more sensors of the secondary device includes determining that the secondary device is within a threshold distance of the device and, in response to determining that the secondary device is within the threshold distance of the device, obtaining the data from the one or more sensors of the secondary device.

6. The method of claim 4, wherein the one or more sensors of the secondary device include all of the plurality of sensors.

7. The method of claim 1, wherein the plurality of sensors includes a plurality of sensors of different sensor types that generate data based on different physical properties.

8. The method of claim 1, wherein obtaining the current location signature includes generating a concatenated vector by concatenating the data obtained from the plurality of sensors.

9. The method of claim 8, wherein obtaining the current location signature further includes determining a feature vector indicative of an amount of each of a set of features in the concatenated vector.

10. The method of claim 1, wherein obtaining the current location signature includes:

determining, for each of the plurality of sensors, a sensor-specific feature vector indicative of the amount of each of a set of sensor-specific features in the data from the sensor; and generating a concatenated feature vector by concatenating the sensor-specific feature vectors.

11. The method of claim 1, wherein determining the location of the device includes selecting the one or more enrolled locations signatures based on comparing the current location signature to the plurality of enrolled location signatures.

12. The method of claim 11, wherein selecting the one or more enrolled locations signatures includes selecting a single location of the plurality of locations as the respective location and wherein setting the location of the device includes setting the location of the device as the single location.

13. The method of claim 11, wherein selecting the one or more enrolled locations signatures includes selecting multiple locations of the plurality of locations and wherein setting the location of the device includes setting the location of the device to the respective location between the multiple locations.

14. The method of claim 1, wherein determining the location of the device includes determining a regression function based on the plurality of enrolled location signatures and the respectively associated plurality of locations and applying the regression function to the current location signature.

15. The method of claim 1, further comprising:

determining a current time; and selecting a subset of the plurality of enrolled location signatures based on the current time and respective times associated with each of the plurality of enrolled location signatures, wherein determining the location of the device is based on the current location signature and the subset of the plurality of enrolled location signatures.

16. A device comprising:

a non-transitory memory; and one or more processors to:

obtain a plurality of enrolled location signatures respectively associated with a plurality of locations in an environment, wherein the plurality of enrolled location signatures are generated by the device based on sensor data from sensors captured in the environment during enrollment;

obtain data from a plurality of sensors;

generate a current location signature based on the data obtained from the plurality of sensors; and determine a location of the device in the environment by selecting one or more enrolled locations signatures from the plurality of enrolled location signatures closest to the current location signature, and setting the location of the device to a respective location in association with the one or more enrolled locations.

17. The device of claim 16, wherein obtaining the data from the plurality of sensors includes obtaining data from one or more sensors of a secondary device.

18. The device of claim 16, wherein the plurality of sensors includes a plurality of sensors of different sensor types that generate data based on different physical properties.

19. The device of claim 16, wherein the one or more processors are further to:

determine a current time; and select a subset of the plurality of enrolled location signatures based on the current time and respective times associated with each of the plurality of enrolled location signatures, wherein the one or more processors are to determine the location of the device based on the current location signature and the subset of the plurality of enrolled location signatures.

20. A non-transitory memory storing one or more programs, which, when executed by one or more processors of a device with a plurality of sensors, cause the device to:

obtain a plurality of enrolled location signatures respectively associated with a plurality of locations in an environment, wherein the plurality of enrolled location signatures are generated by the device based on sensor data from sensors captured in the environment during enrollment;

obtain data from a plurality of sensors;

generate a current location signature based on the data obtained from the plurality of sensors; and determine a location of the device in the environment by selecting one or more enrolled locations signatures from the plurality of enrolled location signatures closest to the current location signature, and setting the location of the device to a respective location in association with the one or more enrolled locations.

* * * * *